(12) United States Patent
Huang

(10) Patent No.: US 11,585,371 B2
(45) Date of Patent: Feb. 21, 2023

(54) VACUUM SUCKER DEVICE

(71) Applicant: Bingliang Huang, Jiangmen (CN)

(72) Inventor: Bingliang Huang, Jiangmen (CN)

(*) Notice: Subject to any disclaimer, the term of this patent is extended or adjusted under 35 U.S.C. 154(b) by 107 days.

(21) Appl. No.: 17/380,380

(22) Filed: Jul. 20, 2021

(65) Prior Publication Data

US 2022/0056944 A1 Feb. 24, 2022

(30) Foreign Application Priority Data

Aug. 18, 2020 (CN) .......................... 202021731215.8

(51) Int. Cl.
*F16B 47/00* (2006.01)
*F16M 13/02* (2006.01)

(52) U.S. Cl.
CPC ............ *F16B 47/006* (2013.01); *F16B 47/00* (2013.01); *F16M 13/022* (2013.01)

(58) Field of Classification Search
CPC ..... F16B 47/00; F16B 47/006; F16M 13/022; B65G 49/061
See application file for complete search history.

(56) References Cited

U.S. PATENT DOCUMENTS

| | | | | |
|---|---|---|---|---|
| 3,152,828 A * | 10/1964 | Lytle | ...................... | B65G 47/91 294/189 |
| 6,932,306 B2 * | 8/2005 | Zou | ........................ | F16B 45/00 248/205.5 |
| 7,635,111 B2 * | 12/2009 | Hara | ....................... | F16B 47/00 248/205.8 |
| 7,708,245 B2 * | 5/2010 | Woo | ......................... | G09F 7/12 248/362 |
| 8,066,238 B1 * | 11/2011 | Kuo | ...................... | F16B 47/006 248/362 |
| 8,302,920 B2 * | 11/2012 | Tsai | ....................... | F16B 47/00 248/205.5 |
| 8,979,046 B2 * | 3/2015 | Woo | ...................... | F16M 13/02 248/205.8 |
| 9,422,970 B1 * | 8/2016 | Fan | ........................ | A47K 10/12 |
| 9,494,184 B1 * | 11/2016 | Lee | ......................... | F16B 47/00 |
| 9,611,884 B1 * | 4/2017 | Kuo | ....................... | F16B 47/00 |

(Continued)

FOREIGN PATENT DOCUMENTS

| | | | | |
|---|---|---|---|---|
| FR | 2920220 A1 * | 2/2009 | ......... | B60R 11/0258 |
| KR | 20070102293 A * | 10/2007 | ............. | F16B 47/00 |

(Continued)

*Primary Examiner* — Eret C McNichols
(74) *Attorney, Agent, or Firm* — Hayes Soloway PC

(57) ABSTRACT

Disclosed is a vacuum sucker device, including: a sucker body, configured to attach to a surface, and having an upwardly protruding mounting part at a middle portion of the sucker body, and the mounting part having a neck; a pressing cover, configured to press the sucker body, and having a plurality of outer bevel edges on an outer circumferential portion thereof and a plurality of inner bevel edges on an inner circumferential portion thereof; a rotatable cover, having a locking lug thereon matched with the neck of the mounting part, a plurality of outer pressing blocks therein matched with the outer bevel edges, and a plurality of inner pressing blocks therein matched with the inner bevel edges; and a mounting cover, mounted over the rotatable cover, connected to the mounting part, and having an object hanging groove.

10 Claims, 3 Drawing Sheets

(56) References Cited

U.S. PATENT DOCUMENTS

| | | | |
|---|---|---|---|
| 9,624,963 B2* | 4/2017 | Shi | F16B 47/006 |
| 9,746,022 B2* | 8/2017 | Shi | F16B 47/00 |
| 11,415,166 B2* | 8/2022 | Scanlon | F16B 47/003 |
| 2004/0079848 A1* | 4/2004 | Wu | F16B 45/00 |
| | | | 248/205.5 |
| 2006/0027720 A1* | 2/2006 | Wu | F16B 47/00 |
| | | | 248/205.5 |
| 2007/0075196 A1* | 4/2007 | Richter | F16B 47/00 |
| | | | 248/205.8 |
| 2008/0224009 A1* | 9/2008 | Song | F16B 47/003 |
| | | | 248/309.3 |
| 2008/0251664 A1* | 10/2008 | Hara | F16B 47/00 |
| | | | 248/205.8 |
| 2010/0252700 A1* | 10/2010 | Wang | F16M 11/10 |
| | | | 248/206.2 |
| 2015/0240862 A1* | 8/2015 | Shi | F16M 13/022 |
| | | | 248/205.8 |
| 2018/0274722 A1* | 9/2018 | Worden, IV | F16B 47/003 |
| 2020/0173488 A1* | 6/2020 | Liu | F16B 47/006 |
| 2020/0256376 A1* | 8/2020 | Chang | F16K 15/147 |

FOREIGN PATENT DOCUMENTS

| | | | | |
|---|---|---|---|---|
| WO | WO-2011075934 A1 * | 6/2011 | | F16B 47/00 |
| WO | WO-2018111027 A1 * | 6/2018 | | F16B 47/00 |

* cited by examiner

VACUUM SUCKER DEVICE

CROSS-REFERENCE TO RELATED APPLICATION

This application claims priority to Chinese patent application No. 202021731215.8 filed Aug. 18, 2020, the content of which is incorporated herein by reference in its entirety.

TECHNICAL FIELD

The present disclosure relates to the field of daily necessities, in particular to a vacuum sucker device.

BACKGROUND

A vacuum sucker can make use of negative pressure to enable a sucker body to attach to a smooth flat surface, such as glass or a ceramic tile, for hanging an object. The vacuum sucker has virtue of easy use, and can be easily removed from the attached object such as the glass or the ceramic tile without damage, it is widely used in daily life and work. For a vacuum sucker of the existing art, generally the negative pressure is generated by discharging the air between the sucker body and an suction surface by a user pushing down or rotating a cover body on the sucker to press the sucker body, to attach the sucker body to the suction surface. However, the structure of the existing rotatable vacuum sucker cannot thoroughly remove the air between the sucker body and the suction surface, and as a result, the generated adsorption force is lower, leading to insecure attachment.

SUMMARY

The present disclosure aims to at least partially solve one of the technical problems existing in the prior art. Therefore, the present disclosure proposes a vacuum sucker device which offers a greater adsorption force by thoroughly remove the air between a sucker body and an adsorption surface.

A vacuum sucker device according to an embodiment of a first aspect of the present disclosure includes: a sucker body, configured to attach to a surface, and having an upwardly protruding mounting part at a middle portion of the sucker body, and the mounting part having a neck; a pressing cover, configured to press the sucker body, and having a plurality of outer bevel edges on an outer circumferential portion of the pressing cover and a plurality of inner bevel edges on an inner circumferential portion of the pressing cover; a rotatable cover, having a locking lug thereon matched with the neck of the mounting part, a plurality of outer pressing blocks therein matched with the outer bevel edges respectively, and a plurality of inner pressing blocks therein matched with the inner bevel edges respectively; and a mounting cover, mounted over the rotatable cover, connected to the mounting part, and having an object hanging groove.

The vacuum sucker device according to the embodiment of the first aspect of the present disclosure has at least the following beneficial effects: the outer bevel edges are arranged on the outer circumferential portion of the pressing cover, the inner bevel edges are arranged on the inner circumferential portion of the pressing cover, and the outer pressing blocks matched with the outer bevel edges and the inner pressing blocks matched with the inner bevel edges are arranged on the rotatable cover. Consequently, when the rotatable cover is rotated, the inner pressing blocks located on the inner circumferential portion and the outer pressing blocks located on the outer circumferential portion simultaneously exert pressure to the sucker body through the corresponding slopes, so as to thoroughly remove the air between the sucker body and the adsorption surface, and therefore the generated adsorption force is greater, leading to more secure adsorption.

The vacuum sucker device according to the embodiment of the first aspect of the present disclosure further includes a surface cover configured to cover the object hanging groove of the mounting cover, preventing the object hanged from falling off by closing the object hanging groove.

According to the embodiment of the first aspect of the present disclosure, the object hanging groove is an L-shaped hole, the surface cover has a positioning rod thereon matched with and extending into the object hanging groove. The positioning rod has two functions here, firstly it serves to direct the surface cover in mounting, such that the surface cover can be mounted more easily, and secondly, the positioning rod has a lower portion shaped like an arc-shaped hook, forming a circular hole or an elliptical hole with the object hanging groove, such that the hung object can be better fixed.

According to the embodiment of the first aspect of the present disclosure, the mounting cover has an insertion hole, the surface cover has an insert rod thereon corresponding to the insertion hole, and the insert rod is inserted into the insertion hole to fix the surface cover on the mounting cover. Connection is carried out in an inserting manner by the insertion holes and the insert rods matched, such that the assembly and disassembly of the sucker can be done without using tools, which is simple and convenient.

According to the embodiment of the first aspect of the present disclosure, the mounting cover has a mounting rod thereon, the mounting part of the sucker body has a mounting hole on a top portion thereof, and the mounting rod is inserted into the mounting hole. Connection is carried out in an inserting manner by the mounting rod and the mounting hole matched, such that the assembly and disassembly of the sucker can be done without using tools, which further increases convenience.

According to the embodiment of the first aspect of the present disclosure, the rotatable cover has a plurality of locking lugs arranged annularly. The locking lugs in an annularly arrangement can be better matched with the neck, while ensuring the evenness of force-bearing points at the joint.

According to the embodiment of the first aspect of the present disclosure, the pressing cover has first notches formed in top portions of the outer bevel edges. When the rotatable cover is rotated to move the outer pressing blocks to the top of the outer bevel edges, the outer pressing blocks engage into the first notches for positioning.

According to the embodiment of the first aspect of the present disclosure, the pressing cover has second notches formed in top portions of the inner bevel edges. When the rotatable cover is rotated to move the inner pressing blocks to the top of the inner bevel edges, the inner pressing blocks engage into the second notches for positioning. Further, the outer pressing blocks and the inner pressing blocks enter the corresponding notches at the same time.

According to the embodiment of the first aspect of the present disclosure, the sucker body has a positioning salient point thereon, and the pressing cover has a positioning notch on a lower portion thereof corresponding to the positioning salient point. By mating the positioning salient points with the positioning notches, the pressing cover is positioned on the sucker body and will not be rotated with the rotatable cover.

According to the embodiment of the first aspect of the present disclosure, the sucker body has a handle thereon. A user can easily take off the sucker body attaching on the plane just by holding the handle and applying force, offering convenience in use.

Part of the additional aspects and advantages of the present disclosure will be described below, or will become clear from the following description, or will be understood through the practice of the present disclosure.

BRIEF DESCRIPTION OF THE DRAWINGS

The aforementioned and/or additional aspects and advantages of the present disclosure will become more apparent and easier to be understood from the description of the embodiments in conjunction with the following drawings, wherein.

Figure 1:
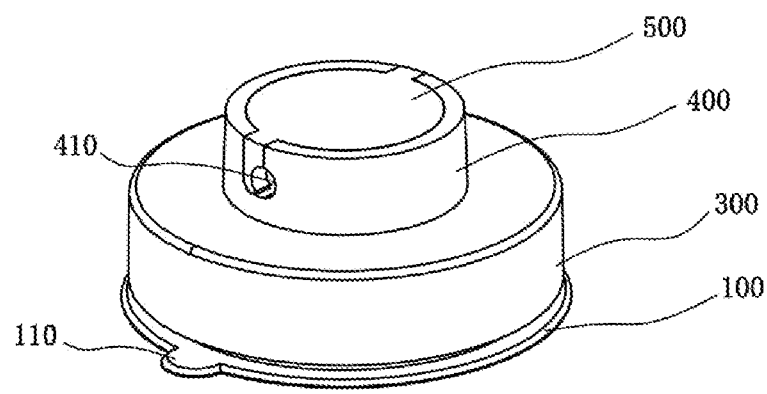
FIG. 1 is a schematic view of a vacuum sucker device according to an embodiment of the present disclosure.

REFERENCE NUMERALS sucker body 100, handle 110, mounting part 120, positioning salient point 130;

pressing cover 200, outer bevel edge 210, first notch 211, inner bevel edge 220, second notch 221, positioning notch 230;

rotatable cover 300, outer pressing block 310, inner pressing block 320;

mounting cover 400, object hanging groove 410, insertion hole 420, mounting rod 430;

surface cover 500, positioning rod 510, insert rod 520.

DETAILED DESCRIPTION

The embodiments of the present disclosure will be described in more detail below. The embodiments are shown in the drawings, wherein the same or similar reference numerals indicate the same or similar elements or elements with the same or similar functions. The embodiments described below with reference to the drawings are exemplary and merely intended to explain the present disclosure, the embodiments shall not be construed as limiting the present disclosure.

In the description of the present disclosure, it should be understood that, the orientation descriptions involved, e.g. the orientation or position relationships indicated by upper, lower, front, back, left, right and the like are based on the orientation or position relationships shown in the drawings, and only intended to facilitate and simplify the description of the present disclosure rather than indicate or imply that the devices or elements referred to must have specific orientations and be structured and operated in the specific orientations, and therefore cannot be understood as a limitation to the present disclosure.

In the description of the present disclosure, "a plurality of" means two or more. If the terms "first" and "second" are described, they are only intended to distinguish technical features rather than indicating or implying relative importance, or implicitly specifying the number of the indicated technical features, or implicitly specifying the precedence relationship of the indicated technical features.

In the description of the present disclosure, unless otherwise clearly defined, the terms such as "arrange", "mount" and "connect" should be understood in a broad sense. Those having ordinary skills in the art to which the present disclosure belongs can reasonably determine the specific meanings of the aforementioned terms in the present disclosure with reference to the specific content of the technical scheme.

Hereinafter, a vacuum sucker device according to the present disclosure will be described with specific embodiments in detail with reference to FIGS. 1 to 4. It should be understood that, the following description is only an exemplary description rather than a specific limitation to the present disclosure.

Figure 3:
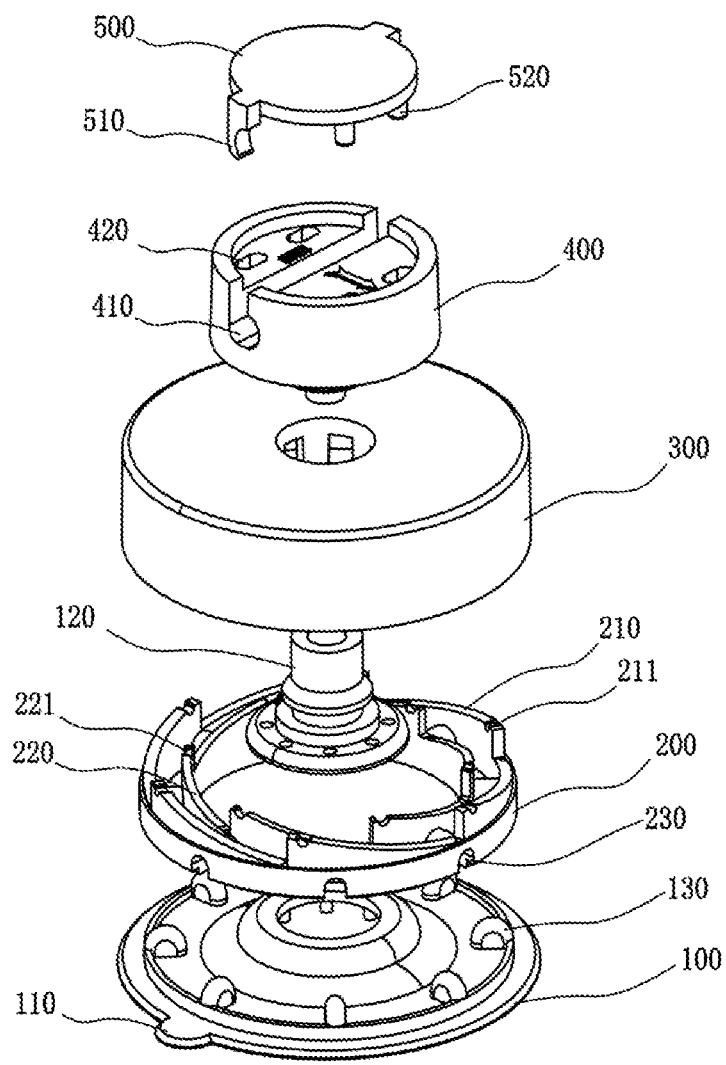
FIG. 3 is an exploded view of the vacuum sucker device shown in FIG. 1.

Referring to FIG. 1 and FIG. 3, a vacuum sucker device provided by the present disclosure includes a sucker body 100, a pressing cover 200, a rotatable cover 300, a mounting cover 400 and a surface cover 500.

Figure 4:
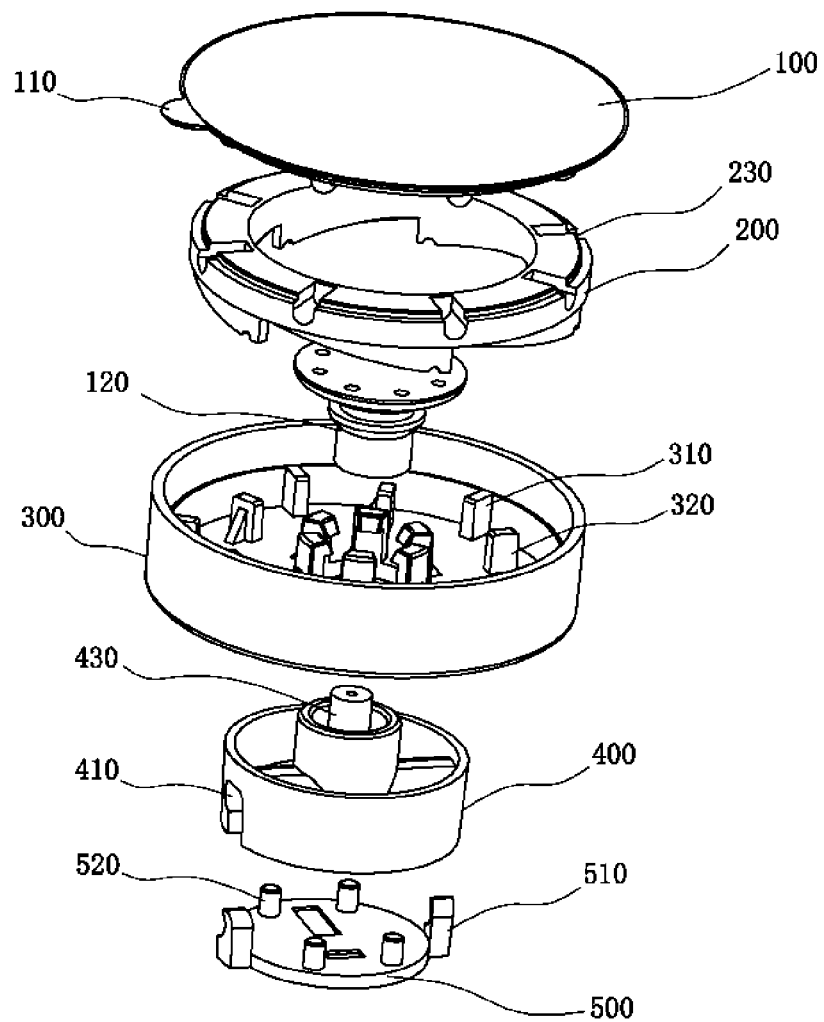
FIG. 4 is an exploded view of the vacuum sucker device shown in FIG. 1 from another perspective.

Specifically, as shown in FIGS. 3 and 4, the sucker body 100 is of a disc-shaped structure made of soft rubber. The sucker body 100 is configured to attach onto a surface. In detail, between the sucker body 100 and the adsorption surface, vacuum negative pressure is generated after the air is removed, such that the sucker body 100 is pressed against the adsorption surface by the atmospheric pressure. The sucker body 100 is provided with an upwardly protruding mounting part 120 at the middle thereof, and the mounting part 120 is formed to connect other parts for mounting the sucker. The mounting part 120 is provided with an annular neck on an outer side thereof, and the mounting part 120 is provided with a mounting hole at a top portion thereof. The sucker body 100 is provided with a plurality of positioning salient points 130 evenly distributed on the sucker body 100.

Further, in the embodiment, the sucker body 100 is provided with a handle 110 arranged on an edge thereof, such that a user can easily remove the sucker body 100 from the surface just by holding the handle 110 and applying force on it.

Figure 2:
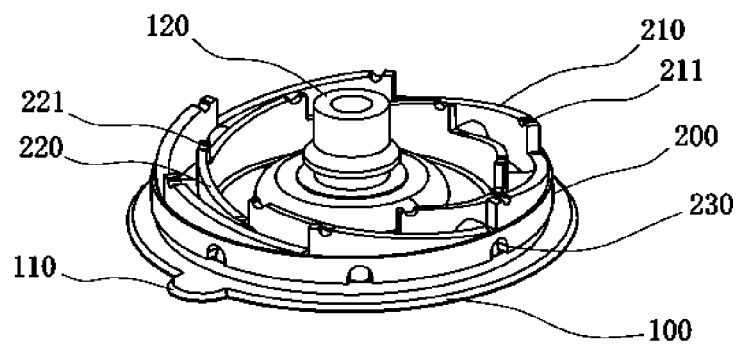
FIG. 2 is a schematic view of a sucker body and a pressing cover shown in FIG. 1.

Referring to FIG. 2, the pressing cover 200 is arranged on the sucker body 100 and is constructed to press the sucker body 100. The pressing cover 200 is provided with a plurality of positioning notches 230 at a lower portion thereof corresponding to the positioning salient points 130 of the sucker body 100. By matching the positioning salient points 130 with the positioning notches 230, the pressing cover 200 is positioned on the sucker body 100 and is not rotatable. A plurality of outer bevel edges 210 are arranged on an outer circumferential portion of the pressing cover 200, and a first notch 211 is arranged in a top portion of each of the outer bevel edges 210. A plurality of inner bevel edges 220 are arranged on an inner circumferential portion of the pressing cover 200, and a second notch 221 is arranged in a top portion of each of the inner bevel edges 220.

Referring to FIGS. 1 and 3, the rotatable cover 300 is arranged over the pressing cover 200, covering the most part of the sucker body 100 and the whole pressing cover 200. Referring to FIG. 4, the rotatable cover 300 is provided with a plurality of locking lugs arranged annularly thereon and matched with the neck in the mounting part 120, allowing the rotatable cover 300 to clamp on the mounting part 120 and to be rotatable freely, while the distance between the rotatable cover 300 and the sucker body 100 remains constant. The rotatable cover 300 is further provided with a plurality of outer pressing blocks 310 matched with the outer bevel edges 210 and a plurality of inner pressing blocks 320 matched with the inner bevel edges 220 arranged therein. When the rotatable cover 300 is rotated clockwise, since the pressing cover 200 will not follow the rotatable cover 300 to rotate, the inner pressing blocks 320 located on an inner circumferential portion of the rotatable cover 300 slide toward the top of the inner bevel edges 220 on the pressing cover 200, and the outer pressing blocks 310 located on an outer circumferential portion of the rotatable cover 300 slide toward the top of the outer bevel edges 210 on the pressing cover 200. The inner pressing blocks 320 and the outer pressing blocks 310 simultaneously exert pressure on the sucker body 100 through the corresponding slopes on the pressing cover 200, to completely remove the air between the sucker body 100 and the suction surface. As a result, the suction force generated is greater, leading to a more secured attachment. When the rotatable cover 300 continues to be rotated, the outer pressing blocks 310 reach the top of the outer bevel edges 210, and are moved into the first notches 211 for positioning. At the same time, the inner pressing blocks 320 reach the top of the inner bevel edges 220, and are moved into the second notches 221 for positioning, the sucker body 100 comes into a suction state. When the rotatable cover 300 is rotated counterclockwise, the inner pressing blocks 320 and the outer pressing blocks 310 slide from the top to the bottom of the corresponding slopes, such that the sucker body 100 returns to its original state.

Referring to FIGS. 1 and 3, the mounting cover 400 is arranged over the rotatable cover 300, a mounting rod 430 is arranged on the mounting cover 400 and connected to the mounting part 120 by being inserted into the mounting hole of the mounting part 120, offering convenience in assembly and disassembly. The mounting cover 400 is provided with an object hanging groove 410, and the object hanging groove 410 may be an L-shaped hole. The mounting cover 400 is provided with a plurality of insertion holes 420.

Referring to FIGS. 1 and 3, the surface cover 500 is arranged on the mounting cover 400, covers and closes the object hanging groove 410, preventing the hung object hanged in the object hanging groove 410 from falling off. Referring to FIG. 4, the surface cover 500 is provided with positioning rods 510 and inserting rods 520 arranged thereon. The insert rods 520 correspond to the insertion holes 420, and while assembled, the insert rods 520 are inserted into the insertion holes 420 to fix the surface cover 500 on the mounting cover 400, offering convenience in assembly and disassembly. The positioning rods 510 are matched with the object hanging groove 410, and while assembled, the positioning rods 510 extend into the object hanging groove 410. The positioning rod 510 may have two functions, firstly, it can serve to position the surface cover 500 in mounting, allowing the surface cover 500 to be mounted more easily, and secondly, the positioning rod 510 has a lower portion shaped like an arc-shaped hook, forming a circular hole or an elliptical hole together with the object hanging groove 410, such that the hung object can be better fixed.

In the description of this specification, the descriptions with reference to the terms "an embodiment", "some embodiments", "exemplary embodiments", "examples", "specific examples", or "some examples" and the like are intended to indicate that specific features, structures, materials or characteristics described in the embodiments or examples are included in at least one embodiment or example of the present disclosure. In this specification, the schematic expressions of the aforementioned terms do not necessarily refer to the same embodiment or example. Moreover, the described specific features, structures, materials or characteristics can be combined in any one or more embodiments or examples in an appropriate manner.

Although the embodiments of the present disclosure have been shown and described, those having ordinary skills in the art can understand that various changes, modifications, substitutions and variations can be made to these embodiments without departing from the principle and purpose of the present disclosure, and the scope of the present disclosure is defined by the claims and their equivalents.

What is claimed is:

1. A vacuum sucker device, comprising:
   a sucker body, configured to attach to a surface, and having an upwardly protruding mounting part at a middle portion of the sucker body, and the mounting part having a neck;
   a pressing cover, configured to press the sucker body, and having a plurality of outer bevel edges on an outer circumferential portion thereof and a plurality of inner bevel edges on an inner circumferential portion thereof;
   a rotatable cover, having a locking lug thereon matched with the neck of the mounting part, a plurality of outer pressing blocks therein matched with the outer bevel edges respectively, and a plurality of inner pressing blocks therein matched with the inner bevel edges respectively; and
   a mounting cover, mounted over the rotatable cover, connected to the mounting part, and having an object hanging groove.

2. The vacuum sucker device of claim 1, further comprising a surface cover configured to cover the object hanging groove of the mounting cover.

3. The vacuum sucker device of claim 2, wherein, the object hanging groove is an L-shaped hole, the surface cover has a positioning rod thereon matched with and extending into the object hanging groove.

4. The vacuum sucker device of claim 2, wherein, the mounting cover has a insertion hole, the surface cover has an insert rod thereon corresponding to the insertion hole, and the insert rod is inserted into the insertion hole to fix the surface cover on the mounting cover.

5. The vacuum sucker device of claim 1, wherein, the mounting cover has a mounting rod thereon, the mounting part of the sucker body has a mounting hole on a top portion thereof, and the mounting rod is inserted into the mounting hole.

6. The vacuum sucker device of claim 1, wherein, the rotatable cover has a plurality of locking lugs arranged annularly.

7. The vacuum sucker device of claim 1, wherein, the pressing cover has first notches formed in top portions of the outer bevel edges.

8. The vacuum sucker device of claim 1, wherein, the pressing cover has second notches formed in top portions of the inner bevel edges.

9. The vacuum sucker device of claim 1, wherein, the sucker body has a positioning salient point thereon, and the pressing cover has a positioning notch on a lower portion thereof corresponding to the positioning salient point.

10. The vacuum sucker device of claim 1, wherein, the sucker body a handle thereon.

* * * * *